United States Patent [19]

Cree

[11] 4,434,625
[45] Mar. 6, 1984

[54] COMPUTER COOLING SYSTEM

[75] Inventor: Roger W. Cree, Stillwater, Minn.

[73] Assignee: Control Data Corporation, Minneapolis, Minn.

[21] Appl. No.: 488,320

[22] Filed: Apr. 20, 1983

[51] Int. Cl.³ .............................................. F25B 5/00
[52] U.S. Cl. ..................................... 62/199; 62/238.6; 62/498
[58] Field of Search ...................... 62/199, 238.6, 117, 62/498

[56] References Cited

U.S. PATENT DOCUMENTS

| | | | |
|---|---|---|---|
| 2,554,920 | 5/1951 | Phillips | 62/8 |
| 3,214,929 | 10/1962 | Anderson | 62/117 |
| 3,350,895 | 11/1967 | Harnish | 62/197 |
| 4,285,205 | 8/1981 | Martin et al. | 62/113 |
| 4,357,805 | 11/1982 | Manning | 62/117 |
| 4,406,137 | 9/1983 | Demuth et al. | 62/238.6 |
| 4,407,142 | 10/1983 | O'Reilly | 62/238.6 |

Primary Examiner—Ronald C. Capossela

Attorney, Agent, or Firm—Edmund J. Wasp; Joseph A. Genovese

[57] ABSTRACT

A computer cooling system has gaseous refrigerant compressed in a compressor and delivered to a first stage condenser. The first stage condenser includes a heat exchanger through which return coolant from the building heating system circulates to partially condense the gaseous refrigerant. The partially condensed refrigerant is directed to a second stage condenser wherein a portion of the refrigerant is diverted and flashed through an expansion valve into the second stage condenser to fully condense the nondiverted portion of the refrigerant before delivering it to the cooling coils of the computer. A pressure regulator valve controls the pressure and temperature of the diverted refrigerant in the second stage condenser to ensure that the nondiverted refrigerant is fully condensed. The used diverted refrigerant is discharged from the second stage condenser through the pressure regulator valve into an accumulator which also collects return coolant from the cooling coils of the computer. The used coolant is delivered from the accumulator back to the compressor through a main return conduit.

6 Claims, 1 Drawing Figure

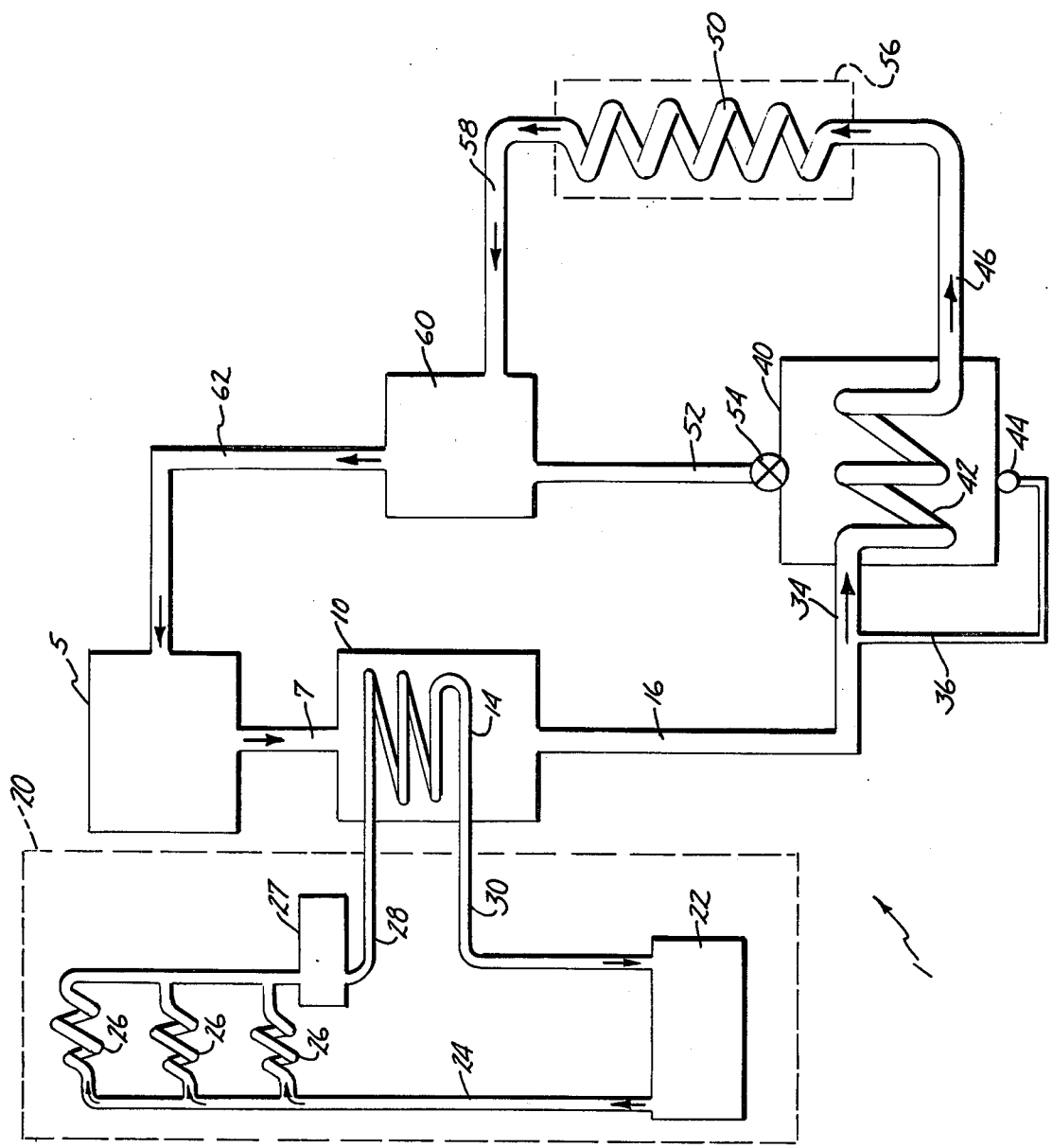

COMPUTER COOLING SYSTEM

BACKGROUND

The invention relates to computer cooling systems in general and in particular to computer cooling systems which are in an energy exchange relationship with the building heating system.

Cooling systems for computers are typically designed as single condenser systems wherein the gaseous refrigerant supplied by the compresser is fully condensed to a liquid refrigerant by a single condenser. Where the single condenser is employed with the heating system of a building, such that heat exchange conduits within the condenser are carrying the building coolant water, it is necessary that the building coolant be supplied to the condenser at a specified temperature or less, typically around 60° F. in order to ensure that the refrigerant is fully condensed. Where the only readily available building coolant is relatively warm, say around 90° F., the computer user must undertake the additional expense of cooling the available coolant to the 60° F. specification in order to satisfy the computer cooling system requirements.

SUMMARY

The present invention avoids such additional expense, while improving energy efficiency, by using the available relatively warm building coolant to partially condense the gaseous refrigerant of the computer cooling system, and then providing a second stage condenser to fully condense the refrigerant before supplying it to the computer cooling coils. A portion of the partially condensed refrigerant is diverted into the second stage condenser through an expansion valve to fully condense the nondiverted portion of refrigerant. A pressure regulator valve controls the pressure and temperature of the diverted refrigerant within the second stage condenser to ensure that the nondiverted refrigerant passing through the second stage condenser is fully condensed before being discharged to the computer cooling coils.

In addition to providing for complete condensation of the refrigerant, the invention improves the overall energy efficiency of the heating system in that the compressed refrigerant passing through the first stage condenser heats the available building coolant passing through the condenser heat exchanger so that the building coolant returns to the boiler of the building heating system with a greater heat value. Hence, while the building coolant helps to cool and condense the computer system coolant, the computer system refrigerant in return gives up heat to the same building coolant so the coolant has greater heat value in returning to the building system boiler.

It is, therefore, an object of the present invention to provide an improved computer cooling system.

It is a further object to provide a computer cooling system which utilizes relatively warm available building coolant to partially condense the cooling system refrigerant.

It is another object to provide a computer cooling system which donates heat to the building heating system through building coolant water which is used to cool and partially condense the cooling system refrigerant.

Still another object is to provide a computer cooling system wherein relatively warm building water is used to partially condense refrigerant and a second stage condenser is used to completely condense refrigerant.

Yet another object is provide a computer cooling system having a second stage condenser, wherein a portion of the partially condensed refrigerant supplied to the second stage condenser is directed through an expansion valve into the second stage condenser to cool and completely condense the nondiverted portion of the refrigerant.

Still another object is to provide a computer cooling system having a second stage condenser wherein a pressure regulator valve controls the pressure and temperature of refrigerant diverted into the second stage condenser through an expansion valve to ensure that the nondiverted portion of the refrigerant is fully condensed before being supplied to the computer cooling coils.

These and other objects, advantages and novel features of the invention will become apparent from the following detailed description of the invention taken in conjunction with the accompanying drawings.

DESCRIPTION OF THE SOLE FIGURE

The sole FIGURE is a schematic diagram of the present invention.

DESCRIPTION OF THE PRESENTLY PREFERRED EMBODIMENT

The cooling system 1 for a computer 56 has a compressor 5 which compresses the lower temperature, lower pressure gaseous refrigerant into higher temperature, higher pressure gaseous refrigerant which is discharged through conduit 7 into a first stage condenser 10. The gaseous refrigerant is cooled and partially condensed by the cooler heat exchange conduits 14 in first stage condenser 10 before being discharged as lower temperature, partially liquid refrigerant through conduit 16.

Heat exchange conduit 14 carries coolant supplied by the building heating system 20. Heating system 20, for example, includes a boiler 22, conduit 24, heat exchanger 26, condenser 27, supply conduit 28, and return conduit 30. In the present preferred embodiment, heating system 20 is a steam heating system. Typically in such systems, water is converted to steam in boiler 22, supplied to individual room heat exchangers 26 via conduit 24, and then condensed back into liquid in condenser 27 before being returned to boiler 22. According to the configuration of the invention, however, the return water of condenser 27 is supplied to the heat exchange coils 14 to cool and condense the refrigerant in condenser 10 before being returned to boiler 22 via conduit 30. This deviation in the path of the return coolant from the heat exchangers 26 serves two purposes: First, the coolant water flowing through heat exchange coils 14 cools and partially condenses the gaseous refrigerant flowing through condenser 10. Second, the coolant water becomes heated while flowing through the heat exchange conduit 14 and therefore contributes heat energy to heating system 20 when it returns to boiler 22.

The partially liquid refrigerant exiting condenser 10 through conduit 16 is split between main conduit 34 and a diversion conduit 36. The nondiverted portion of refrigerant flows through a heat exchanger 42 in a second stage condenser 40, while the diverted portion of refrigerant passes through diversion conduit 36 and is flashed into the second stage condenser 40 through an expansion valve 44. As the diverted portion of the refrigerant is flashed through expansion valve 44 it drops markedly in temperature to cool and fully condense the refrigerant passing through heat exchanger 42. Hence, while only partially liquid refrigerant is discharged from first stage condenser 10, second stage condenser 40 ensures that the refrigerant is fully condensed before being directed through conduit 46 to the cooling coils 50 which cool the computer 56. After the diverted refrigerant has been used to fully condense the refrigerant in heat exchanger 42, it is discharged through conduit 52 into an accumulator 60 under the control of pressure regulator valve 54. Used refrigerant from computer cooling coils 50 also returns to accumulator 60 through a return conduit 58. The used refrigerant from conduit 58 and the used diverted refrigerant from conduit 52 are then returned from accumulator 60 to compressor 5 through main return conduit 62.

Pressure regulator valve 54 can be used to control the temperature of the liquid refrigerant leaving condenser 40 via conduit 46 and to ensure that the refrigerant is fully condensed in second stage condenser 40. A thermostat can be installed in conduit 46 to sense the temperature of the refrigerant. In addition, a sight glass can be provided in conduit 46 to ensure that the refrigerant is a solid head of liquid free of any gaseous bubbles (i.e., fully condensed). The thermostat and sight glass can then be monitored, and should the temperature of the refrigerant rise too high, or should gas bubbles begin to appear in the refrigerant in line 46, the pressure regulator valve 54 can be adjusted to lower the pressure and temperature of the diverted refrigerant in second stage condenser 40 to correspondingly lower the temperature of the refrigerant in conduit 46 or remove the gas bubbles therefrom.

The invention is particularly suited to a situation wherein only relatively warm cooling water is readily available. For example, assume a computer cooling system which is designed with a single condenser 10 to fully condense the refrigerant. Assume further, that in order to fully condense refrigerant passing through condenser 10 the water input to the heat exchange coil 14 through conduit 28 must have a temperature of 60° F. or cooler. Now, if the only readily available coolant is above the 60° F. design specification, the refrigerant will not be fully condensed by condenser 10. One option is to install equipment which will raise the temperature of the building coolant to the 60° F. specification. However, this option is extremely costly and inefficient. According to the present invention, however, the readily available coolant is used to partially condense the refrigerant in condenser 10, and a second stage condenser 40 is used to completely condense the refrigerant in order to provide a solid head of liquid refrigerant to the computer cooling coils 50. Moreover, the computer cooling system donates heat energy to the building heating system, increasing the heating system's overall efficiency.

Having described the basic structure and operation of the present invention, many modifications and variations will be obvious to those skilled in the art, and the invention is accordingly intended to be limited only by the scope of the intended claims.

I claim:

1. A cooling system for a computer, comprising:
 a compressor for compressing lower pressure, lower temperature gaseous refrigerant of said cooling system into higher pressure, higher temperature gaseous refrigerant;
 a first stage condenser for condensing said higher pressure, higher temperature gaseous refrigerant into lower temperature, partially liquid refrigerant, said first stage condenser including a heat exchange conduit which carries liquid coolant from a building heating system comprised of a boiler, supply conduits from said boiler to a plurality of heat exchangers, return conduits from said heat exchangers to a heating system condenser, and conduits from said heating system condenser to said boiler, said heat exchange conduits of said condenser being supplied liquid coolant from said heating system condenser, said coolant passing through said heat exchange conduits of said first stage condenser before returning to said boiler, said higher pressure, higher temperature gaseous refrigerant of said cooling system giving up heat to said coolant in said heat exchange conduits before leaving said condenser as lower temperature, partially liquid refrigerant;
 a second stage condenser for condensing said partially liquid refrigerant to fully condensed liquid refrigerant, comprising a diversion conduit for directing a portion of said partially liquid refrigerant to an expansion valve of said second stage condenser, a heat exchange conduit for carrying the nondiverted portion of said partially liquid refrigerant through said second stage condenser, the diverted portion of said partially liquid refrigerant being flushed into said second stage condenser through said expansion valve to reduce the temperature of said nondiverted portion of said partially liquid refrigerant in said heat exchange conduit so that fully condensed refrigerant leaves said second stage condenser from said heat exchange conduits; and
 cooling coils for cooling said computer, said fully condensed refrigerant passing through said cooling coils to draw heat from and cool said computer whereby used refrigerant is discharged from said cooling coils and returned to said compressor.

2. The cooling system of claim 1 wherein said diverted refrigerant which is flashed into said second stage condenser returns to said compressor from said second stage condenser after cooling said nondiverted portion of the refrigerant.

3. The cooling system of claim 2 wherein a pressure regulator valve is installed at the outlet of said second stage condenser to control the flow of diverted refrigerant from said second stage condenser to said compresser.

4. The cooling system of claim 3 wherein said pressure regulator valve regulates the pressure of said diverted refrigerant within said second stage condenser in order to control the temperature and condensation of said nondiverted refrigerant flowing from said second stage condenser to said cooling coils of said computer.

5. The cooling system of claim 2 further comprising an accumulator operatively positioned between said cooling coils and said compressor, and between said second stage condenser and said compressor, whereby used refrigerant from said cooling coils and used diverted refrigerant from said second stage condenser are collected together in said accumulator before being returned to said compressor.

6. The cooling system of claim 1 wherein said liquid coolant supplied by said building heating system to said heat exchange conduits of said first stage condenser is water returning from said heat exchangers of said heating system to said boiler of the heating system, and wherein said water passing through said heat exchange conduits of said first stage condenser is heated by said refrigerant going through said first stage condenser before returning to said boiler.

* * * * *